United States Patent
Von Novak, III et al.

(10) Patent No.: US 10,651,657 B2
(45) Date of Patent: May 12, 2020

(54) DYNAMIC ADJUSTMENT OF POWER FOR WIRELESS POWER TRANSMISSION

(71) Applicant: QUALCOMM Incorporated, San Diego, CA (US)

(72) Inventors: William Henry Von Novak, III, San Diego, CA (US); Linda Stacey Irish, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 796 days.

(21) Appl. No.: 14/732,907

(22) Filed: Jun. 8, 2015

(65) Prior Publication Data

US 2016/0359337 A1    Dec. 8, 2016

(51) Int. Cl.
*H02J 5/00* (2016.01)
*H02J 50/12* (2016.01)

(52) U.S. Cl.
CPC ............. *H02J 5/005* (2013.01); *H02J 50/12* (2016.02)

(58) Field of Classification Search
CPC .. H02J 5/005; H02J 50/12; H02J 17/00; H02J 50/00
USPC ........................................................ 307/104
See application file for complete search history.

(56) References Cited

U.S. PATENT DOCUMENTS

| 7,570,220 | B2 | 8/2009 | Hall et al. | |
|---|---|---|---|---|
| 8,362,651 | B2 | 1/2013 | Hamam et al. | |
| 2005/0057399 | A1* | 3/2005 | Kipnis | H01Q 1/38 343/700 MS |
| 2007/0296548 | A1 | 12/2007 | Hall et al. | |
| 2009/0243397 | A1* | 10/2009 | Cook | H02J 5/005 307/104 |
| 2010/0072994 | A1* | 3/2010 | Lee | G01N 24/08 324/307 |
| 2013/0043951 | A1 | 2/2013 | Irish et al. | |
| 2013/0099807 | A1 | 4/2013 | Wheeland et al. | |
| 2013/0207601 | A1 | 8/2013 | Wu et al. | |
| 2014/0035704 | A1* | 2/2014 | Efe | H01F 38/14 333/219.2 |
| 2014/0139218 | A1 | 5/2014 | Findeklee et al. | |
| 2014/0152117 | A1 | 6/2014 | Sankar | |
| 2014/0159652 | A1* | 6/2014 | Hall | H02J 7/025 320/108 |

OTHER PUBLICATIONS

"MEMS inductors and capacitors," RF MEMS and Their Applications. Vijay K. Varadan, K.J. Vinoy and K.A. Jose Copyright © 2003 John Wiley & Sons, Ltd. ISBN: 0-470-84308-X.*

* cited by examiner

*Primary Examiner* — Carlos Amaya
(74) *Attorney, Agent, or Firm* — Hunter Clark PLLC

(57) ABSTRACT

An apparatus is disclosed for wireless power transmission. The apparatus may include a resonator circuit configured to generate a magnetic field to couple to a power receiving unit. The resonator circuit may include a transmit coil and an electromechanical reactive device having one or more moveable components, and having a reactance that is determined by a physical arrangement of those components. A power circuit connected to the resonator circuit can provide power to drive the transmit coil to generate the magnetic field. The electromechanical reactive device of the resonator circuit can be actuated to change the physical arrangement of the one or more moveable components, and hence change the reactance.

30 Claims, 9 Drawing Sheets

DYNAMIC ADJUSTMENT OF POWER FOR WIRELESS POWER TRANSMISSION

TECHNICAL FIELD

The present disclosure relates generally to wireless power transfer, and more particularly to electromechanically controlled power in a wireless power transmitter.

BACKGROUND

Unless otherwise indicated, the foregoing is not admitted to be prior art to the claims recited herein and should not be construed as such.

Wireless power transfer is an increasingly popular capability in portable electronic devices, such as mobile phones, computer tablets, etc. because such devices typically require long battery life and low battery weight. The ability to power an electronic device without the use of wires provides a convenient solution for users of portable electronic devices. Wireless power charging systems, for example, may allow users to charge and/or power electronic devices without physical, electrical connections, thus reducing the number of components required for operation of the electronic devices and simplifying the use of the electronic device.

Wireless power transfer allows manufacturers to develop creative solutions to problems due to having limited power sources in consumer electronic devices. Wireless power transfer may reduce overall cost (for both the user and the manufacturer) because charging hardware such as power adapters and charging chords can be eliminated. There is flexibility in having different coil sizes and shapes on the transmitter and/or the receiver in terms of industrial design and support for a wide range of devices, from mobile handheld devices to computer laptops.

SUMMARY

In some aspects of the present disclosure, an apparatus for wireless power transmission may include a resonator circuit configured to generate a magnetic field. The resonator circuit may include a transmit coil and at least one electromechanical reactive device. The electromechanical reactive device may include one or more moveable components and have a reactance that is determined by a physical arrangement of the components. A power circuit may be electrically connected to the resonator circuit to provide power to drive the transmit coil to generate the magnetic field. A controller may be electrically connected to the electromechanical reactive device of the resonator circuit to actuate the electromechanical reactive device to change the physical arrangement of the one or more moveable components, and hence change the reactance.

In some aspects, the controller may be configured to change the reactance of the electromechanical reactive device to maintain the resonant frequency of the resonator circuit at a predetermined resonant frequency.

In some aspects, the controller may be configured to actuate the electromechanical reactive device based on an alternating current (AC) power at the transmit coil.

In some aspects, the controller may be configured to actuate the electromechanical reactive device based on a real component of AC power at the transmit coil and on an imaginary component of the AC power at the transmit coil. For example, the controller may be configured to actuate the electromechanical reactive device in response to the resonator circuit being detuned. A phase difference between the real component of the AC power at the transmit coil and the imaginary component of the AC power at the transmit coil may indicate that the resonator circuit is detuned. For example, the controller may be configured to change the reactance of the electromechanical reactive device until a predetermined phase difference is detected.

In some aspects, the controller may actuate the electromechanical reactive device in response to detection of a sensed voltage level and/or a sensed current flow exceeds a predetermined threshold. For example, the controller may drive a reactance of the electromechanical reactive device in a direction that causes the sensed voltage level and/or a sensed current flow falls below the predetermined threshold.

In some aspects, a first component of the electromechanical reactive device may have a physical position that can change in response to the controller. The first component may have a first physical position associated with a first reactance and at least a second physical position associated with a second reactance.

In some aspects, the electromechanical reactive device may be configured to provide a continuous range of selectable reactance values.

In some aspects, the electromechanical reactive device may be an electromechanical inductor. For example, the electromechanical inductor may include a pair of rotatable plates. Each rotatable plate may have a winding of conductive material wound about the rotatable plate. The inductance of the electromechanical inductor may be determined by a relative orientation of the windings between the rotatable plates. The electromechanical reactive device may further include shape-memory alloy wire connected to either or both of the rotatable plates and configured to cause rotation of one rotatable plate relative to the other rotatable plate. As another example, the electromechanical inductor may include a moveable ferrite slug disposed within a winding of conductive material and shape-memory alloy wire attached to the moveable ferrite slug and configured to vary an amount of overlap between the moveable ferrite slug and the winding of conductive material to vary an inductance of the electromechanical inductor. As yet another example, the electromechanical inductor may include a moveable permanent magnet disposed within a winding of conductive material and first and second electromagnets at first and second ends of the winding of conductive material. The first and second electromagnets may vary an amount of overlap between the moveable permanent magnet and the winding of conductive material to vary an inductance of the electromechanical inductor.

In some aspects, the electromechanical reactive device may be an electromechanical capacitor comprising a plurality of interleaved electrically conductive plates.

In some aspects, the electromechanical reactive device may be an electromechanical capacitor comprising at least a pair of electrically conductive plates and a dielectric material disposed between the pair of electrically conductive plates.

In some aspects of the present disclosure, a method for wirelessly transmitting power may include providing power to a resonator circuit to generate a magnetic field that can couple to a power receiving unit. The method may include detecting that the resonator circuit has become detuned and retuning the resonator circuit in response to detecting that the resonator circuit has become detuned. Retuning may include actuating an electromechanical reactive device in the resonator circuit to change the reactance thereof and hence a resonant frequency of the resonator circuit.

In some aspects, the resonator circuit may be deemed to be detuned when an impedance of the resonator circuit has deviated from a predetermined impedance.

In some aspects, retuning the resonator circuit may include changing the reactance of the electromechanical reactive device to maintain the resonator circuit at a predetermined resonant frequency.

In some aspects, detecting that the resonator circuit has become detuned may include making an AC power measurement. Retuning the resonator circuit may include adjusting a real component of the AC power measurement and/or an imaginary component of the AC power measurement by actuating the electromechanical reactive device.

In some aspects, detecting that the resonator circuit has become detuned may include sensing one or more of a voltage level and a current flow.

In some aspects, the resonator circuit may be deemed to be detuned when a sensed voltage level or a sensed current level exceeds a predetermined threshold.

In some aspects, retuning the resonator circuit may include driving a reactance of the electromechanical reactive device in a direction that a sensed voltage level and/or a sensed current flow falls below the predetermined threshold.

In some aspects of the present disclosure, an apparatus for wirelessly transmitting power may include means for generating a magnetic field configured to couple to an external device for wireless power transfer to the external device, means for sensing a power used to generate the magnetic field and for generating a control signal depending on the power sensed; and means for mechanically adjusting a resonant frequency of the means for generating the magnetic field in response to the control signal.

In some aspects of the present disclosure, an apparatus for wireless power transmission may include a transmit coil to generate a magnetic field to couple to a power receiving unit. The transmit coil may include a shell having an interior volume of the shell, a conductive material wound about the shell, and a fluid having suspended therein ferromagnetic particles contained within the interior volume of the shell. The apparatus may further include a power circuit to provide power to the conductive material wound about the shell and a controller to selectively control movement of the ferromagnetic particles into and out of the interior volume of the shell in response to a power output of the power circuit.

In some aspects, the shell may be donut-shaped.

In some aspects, the transmit coil may include a reservoir in fluid communication with the shell. A first electromagnet first electromagnet may attract the ferromagnetic particles out of the shell and into the reservoir. A second electromagnet may attract the ferromagnetic particles out of the reservoir and into of the shell. The controller may be configured to control the first and second electromagnets to move the ferromagnetic particles into and out of the shell.

The following detailed description and accompanying drawings provide a better understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. In the accompanying drawings.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "power receiving element" to achieve power transfer.

Figure 1:
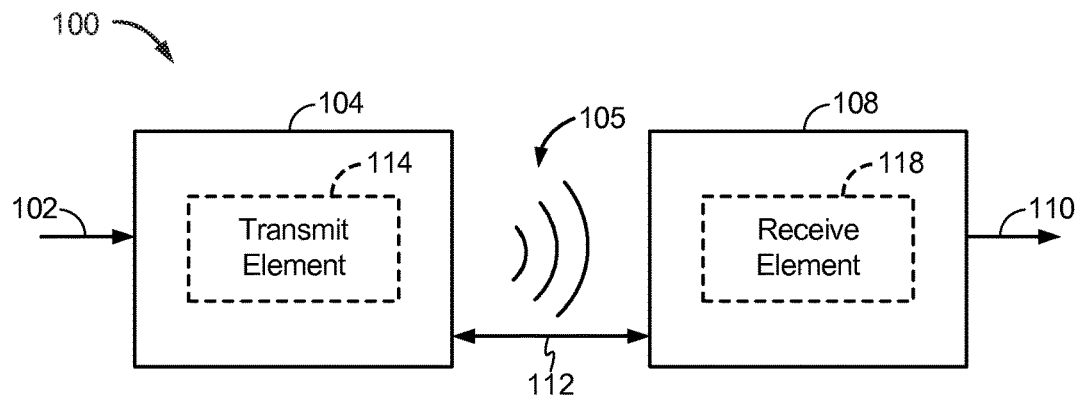
FIG. 1 is a functional block diagram of a wireless power transfer system, in accordance with an illustrative embodiment.

FIG. 1 is a functional block diagram of a wireless power transfer system 100, in accordance with an illustrative embodiment. Input power 102 may be provided to a transmitter 104 from a power source (not shown in this figure) to generate a wireless (e.g., magnetic or electromagnetic) field 105 for performing energy transfer. A receiver 108 may couple to the wireless field 105 and generate output power 110 for storing or consumption by a device (not shown in this figure) coupled to the output power 110. The transmitter 104 and the receiver 108 may be separated by a distance 112. The transmitter 104 may include a power transmitting element 114 for transmitting/coupling energy to the receiver 108. The receiver 108 may include a power receiving element 118 for receiving or capturing/coupling energy transmitted from the transmitter 104.

In one illustrative embodiment, the transmitter 104 and the receiver 108 may be configured according to a mutual resonant relationship. When the resonant frequency of the receiver 108 and the resonant frequency of the transmitter 104 are substantially the same or very close, transmission losses between the transmitter 104 and the receiver 108 are reduced. As such, wireless power transfer may be provided over larger distances. Resonant inductive coupling techniques may thus allow for improved efficiency and power transfer over various distances and with a variety of inductive power transmitting and receiving element configurations.

In certain embodiments, the wireless field 105 may correspond to the "near field" of the transmitter 104 as will be further described below. The near-field may correspond to a region in which there are strong reactive fields resulting from the currents and charges in the power transmitting element 114 that minimally radiate power away from the power transmitting element 114. The near-field may correspond to a region that is within about one wavelength (or a fraction thereof) of the power transmitting element 114.

In certain embodiments, efficient energy transfer may occur by coupling a large portion of the energy in the wireless field 105 to the power receiving element 118 rather than propagating most of the energy in an electromagnetic wave to the far field.

In certain implementations, the transmitter 104 may output a time varying magnetic (or electromagnetic) field with a frequency corresponding to the resonant frequency of the power transmitting element 114. When the receiver 108 is within the wireless field 105, the time varying magnetic (or electromagnetic) field may induce a current in the power receiving element 118. As described above, if the power receiving element 118 is configured as a resonant circuit to resonate at the frequency of the power transmitting element 114, energy may be efficiently transferred. An alternating current (AC) signal induced in the power receiving element 118 may be rectified to produce a direct current (DC) signal that may be provided to charge or to power a load.

Figure 2:
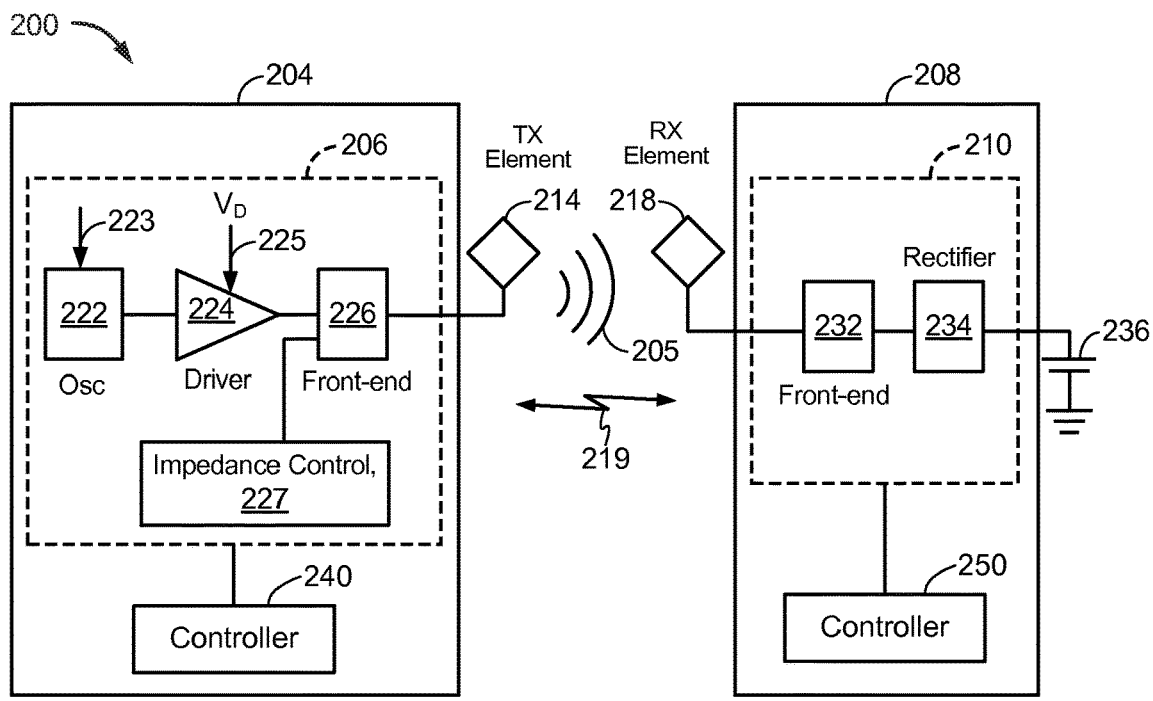
FIG. 2 is a functional block diagram of a wireless power transfer system, in accordance with an illustrative embodiment.

FIG. 2 is a functional block diagram of a wireless power transfer system 200, in accordance with another illustrative embodiment. The system 200 may include a transmitter 204 and a receiver 208. The transmitter 204 (also referred to herein as power transmitting unit, PTU) may include transmit circuitry 206 that may include an oscillator 222, a driver circuit 224, a front-end circuit 226, and an impedance control module 227. The oscillator 222 may be configured to generate a signal at a desired frequency that may adjust in response to a frequency control signal 223. The oscillator 222 may provide the oscillator signal to the driver circuit 224. The driver circuit 224 may be configured to drive the power transmitting element 214 at, for example, a resonant frequency of the power transmitting element 214 based on an input voltage signal (VD) 225. The driver circuit 224 may be a switching amplifier configured to receive a square wave from the oscillator 222 and output a sine wave.

The front-end circuit 226 may include a filter circuit to filter out harmonics or other unwanted frequencies. The front-end circuit 226 may include a matching circuit to match the impedance of the transmitter 204 to the power transmitting element 214. As will be explained in more detail below, the front-end circuit 226 may include a tuning circuit to create a resonant circuit with the power transmitting element 214. As a result of driving the power transmitting element 214, the power transmitting element 214 may generate a wireless field 205 to wirelessly output power at a level sufficient for charging a battery 236, or otherwise powering a load. The impedance control module 227 may control the front-end circuit 226, which will be described in more detail below.

The transmitter 204 may further include a controller 240 operably coupled to the transmit circuitry 206 configured to control one or aspects of the transmit circuitry 206 or accomplish other operations relevant to managing the transfer of power. The controller 240 may be a micro-controller or a processor. The controller 240 may be implemented as an application-specific integrated circuit (ASIC). The controller 240 may be operably connected, directly or indirectly, to each component of the transmit circuitry 206. The controller 240 may be further configured to receive information from each of the components of the transmit circuitry 206 and perform calculations based on the received information. The controller 240 may be configured to generate control signals (e.g., signal 223) for each of the components that may adjust the operation of that component. As such, the controller 240 may be configured to adjust or manage the power transfer based on a result of the operations performed by it. The transmitter 204 may further include a memory (not shown) configured to store data, for example, such as instructions for causing the controller 240 to perform particular functions, such as those related to management of wireless power transfer.

The receiver 208 (also referred to herein as power receiving unit, PRU) may include receive circuitry 210 that may include a front-end circuit 232 and a rectifier circuit 234. The front-end circuit 232 may include matching circuitry to match the impedance of the receive circuitry 210 to the power receiving element 218. As will be explained below, the front-end circuit 232 may further include a tuning circuit to create a resonant circuit with the power receiving element 218. The rectifier circuit 234 may generate a DC power output from an AC power input to charge the battery 236, as shown in FIG. 2. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236. Transmitter 204 may be configured to generate a predominantly non-radiative field with a direct field coupling coefficient (k) for providing energy transfer. Receiver 208 may directly couple to the wireless field 205 and may generate an output power for storing or consumption by a battery (or load) 236 coupled to the output or receive circuitry 210.

The receiver 208 may further include a controller 250 configured similarly to the transmit controller 240 as described above for managing one or more aspects of the wireless power receiver. The receiver 208 may further include a memory (not shown) configured to store data, for example, such as instructions for causing the controller 250 to perform particular functions, such as those related to management of wireless power transfer.

As discussed above, transmitter 204 and receiver 208 may be separated by a distance and may be configured according to a mutual resonant relationship to minimize transmission losses between the transmitter and the receiver.

Figure 3:
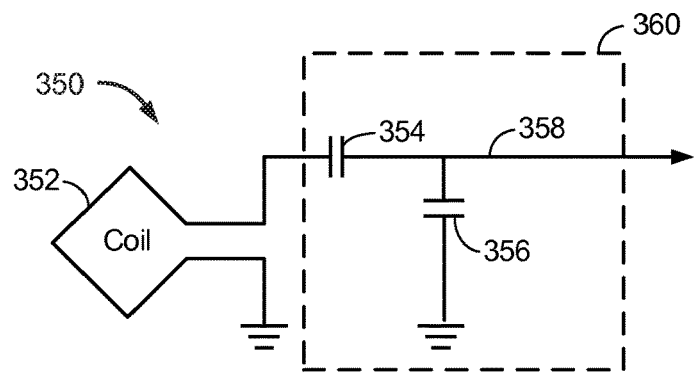
FIG. 3 is a schematic diagram of a portion of transmit circuitry or receive circuitry of FIG. 2 including a power transmitting or receiving element, in accordance with an illustrative embodiment.

FIG. 3 is a schematic diagram of a portion of the transmit circuitry 206 or the receive circuitry 210 of FIG. 2, in accordance with illustrative embodiments. As illustrated in FIG. 3, transmit or receive circuitry 350 may include a power transmitting or receiving element 352 and a tuning circuit 360. The power transmitting or receiving element 352 may also be referred to or be configured as an antenna or a "loop" antenna. The term "antenna" generally refers to a component that may wirelessly output or receive energy for coupling to another "antenna." The power transmitting or receiving element 352 may also be referred to herein or be configured as a "magnetic" antenna, or an induction coil, a resonator, or a portion of a resonator. The power transmitting or receiving element 352 may also be referred to as a coil or resonator of a type that is configured to wirelessly output or receive power. As used herein, the power transmitting or receiving element 352 is an example of a "power transfer component" of a type that is configured to wirelessly output and/or receive power. The power transmitting or receiving element 352 may include an air core or a physical core such as a ferrite core (not shown in this figure).

When the power transmitting or receiving element 352 is configured as a resonant circuit or resonator with tuning circuit 360, the resonant frequency of the power transmitting or receiving element 352 may be based on the inductance and capacitance. Inductance may be simply the inductance created by a coil or other inductor forming the power transmitting or receiving element 352. Capacitance (e.g., a capacitor) may be provided by the tuning circuit 360 to create a resonant structure at a desired resonant frequency. As a non limiting example, the tuning circuit 360 may comprise a capacitor 354 and a capacitor 356 may be added to the transmit and/or receive circuitry 350 to create a resonant circuit.

The tuning circuit 360 may include other components to form a resonant circuit with the power transmitting or receiving element 352. As another non limiting example, the tuning circuit 360 may include a capacitor (not shown) placed in parallel between the two terminals of the circuitry 350. Still other designs are possible. In some embodiments, the tuning circuit in the front-end circuit 226 may have the same design (e.g., 360) as the tuning circuit in front-end circuit 232. In other embodiments, the front-end circuit 226 may use a tuning circuit design different than in the front-end circuit 232.

For power transmitting elements, the signal 358, with a frequency that substantially corresponds to the resonant frequency of the power transmitting or receiving element 352, may be an input to the power transmitting or receiving element 352. For power receiving elements, the signal 358, with a frequency that substantially corresponds to the resonant frequency of the power transmitting or receiving element 352, may be an output from the power transmitting or receiving element 352.

As explained above, a wireless power transmitter 204 (FIG. 2) creates a wireless field 205 (e.g., a magnetic field) that can couple to one or more wireless power receivers for wireless power transfer. The magnetic field may be generated by driving a current through a loop of wire, sometimes referred to as a power transmitting element 214, resonator coil, charging coil, transmit coil, and so on as described above with reference to FIG. 3. A driver circuit 224 may be used to generate the current. A resonator circuit (e.g., 350, FIG. 3) that includes the power transmitting element 214 (e.g., transmit coil) may be "tuned" to the power amplifier to work efficiently. In other words, the impedance of the resonator circuit may be properly matched to the output impedance of the driver circuit 224.

However, the impedance of the power transmitting element 214 (and hence the impedance of the resonator circuit) can depend on the magnetic properties of the materials in the power receiver 208; e.g., the casing of the power receiver 208, the components in the power receiver 208, the power drawn by the power receiver 208, the number of power receivers, and so on. The impedance of the power transmitting element 214 can vary from one power receiver to the next.

Accordingly, the driver circuit 224 that drives the power transmitting element 214 can be subject to a wide range of impedances, which can reduce its efficiency. Changes in the impedance of a power transmitting element 214 may include real power changes (e.g., changes that result from receiving devices that draw more or less power) and reactive power changes (e.g., changes that result from detuning of the power transmitting element 214 due to different materials in different receiving devices).

Detuning may refer to changes in the impedance of the resonator circuit (e.g., due to changes in the impedance of the transmit coil) seen by the driver circuit 224. In some embodiments, for example, the resonator circuit may be deemed to be detuned when its impedance has deviated from a predetermined impedance. Detuning can change the resonant frequency of the resonant network from a predefined resonant frequency (e.g., 6.78 MHz±15 kHz). Detuning can alter the impedance of the power transmitting element 214 and hence the impedance of the resonator circuit, causing a mismatch with the output impedance of the driver circuit 224 that can reduce the operating efficiency of the driver circuit 224.

Figure 4:
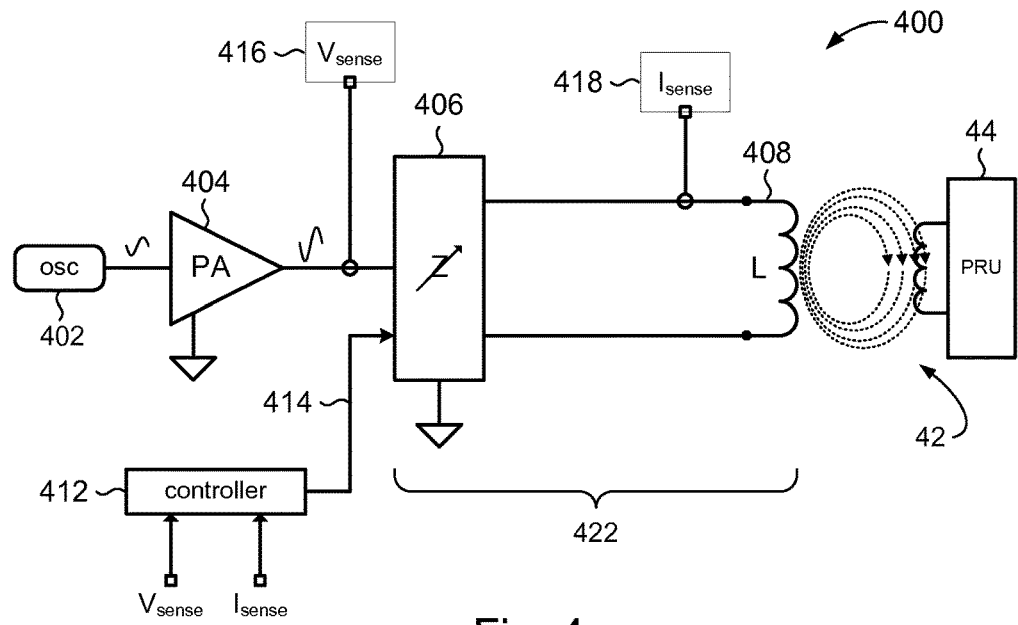
FIG. 4 is a schematic diagram of a transmit circuit in accordance with the present disclosure.

Referring to FIG. 4, transmit circuitry 400 in some embodiments may include an oscillator 402 to generate a time varying signal (alternating current, AC, signal). The oscillator 402 may connect to a driver (power amp) 404. The transmit circuitry 400 may include a variable impedance circuit 406 (e.g., front-end circuit 226, FIG. 2). The transmit circuitry 400 may include means for generating a magnetic field, which may comprise the driver 404 and a resonator circuit 422.

The resonator circuit 422 may include the variable impedance circuit 406 connected to a power transmitting element referred to herein with reference to FIG. 4 and below as transmit coil 408. The resonator circuit 422 may be configured to resonate at a resonant operating frequency. In some embodiments, the transmit coil 408 may be a coil of wire. In other embodiments, the transmit coil 408 may comprises traces formed on a printed circuit board (PCB) in the shape of a coil, and so on.

The variable impedance circuit 406 may filter out harmonics or other unwanted frequencies in the drive signal and match the impedance of the power amp 404 to the transmit coil 408. The variable impedance circuit 406 may include tuning circuitry that can be varied in order to vary a resonant frequency of the resonator circuit 422. In accordance with the present disclosure, the variable impedance circuit 406 may vary the impedance presented to the power amp 404. This aspect of the present disclosure will be explained in more detail below.

The power amp 404 may be configured as means for providing power to the transmit coil 408. The drive signal generated by power amp 404 can drive transmit coil 408 to generate an external time varying magnetic field 42. An external device 44 (e.g., PRU) may couple to the magnetic field 42 for wireless power transfer. The resonator circuit 422 may be configured to resonate at a resonant frequency; e.g., corresponding to the frequency of the signal output from the power amp 404.

The transmit circuitry 400 may include a controller 412 configured to generate a control signal 414 to control variable impedance circuit 406. The transmit circuitry 400 may include means for sensing a power output of the power amp 404. In some embodiments, for example, the transmit circuitry 400 may include a sense circuit 416 configured to sense a voltage level $V_{sense}$. In some embodiments, the sensed voltage level $V_{sense}$ may be the voltage component in the output power of the power amp 404. In some embodiments, the transmit circuitry 400 may include a sense circuit 418 configured to sense a current flow $I_{sense}$. In some embodiments, the sensed current flow $I_{sense}$ may be the current flow into the transmit coil 408. People of skill in the art will understand that other sense points in the transmit circuitry 400 may be suitable for taking $V_{sense}$ and $I_{sense}$. As will be explained below, the controller 412 may be configured to generate control signal 414 based on the sensed parameters $V_{sense}$ and $I_{sense}$.

Figure 4A:
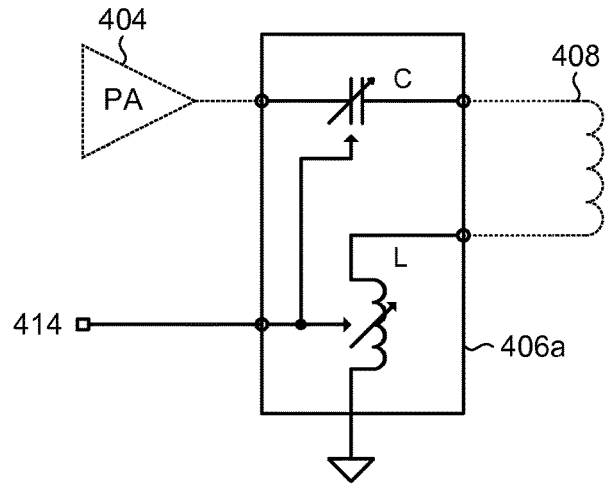
FIGS. 4A and 4B show illustrative examples of variable impedance circuits.
Figure 4B:
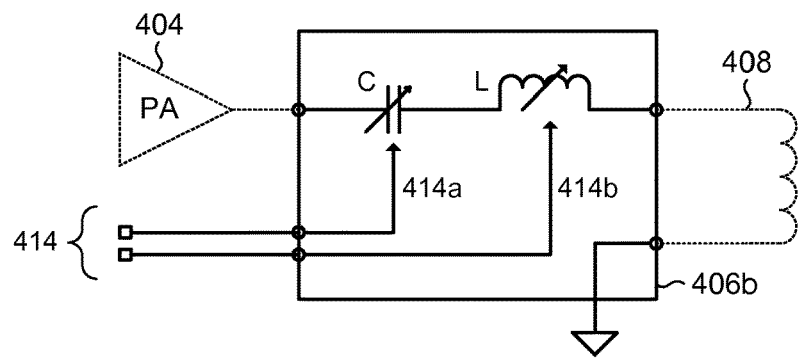

In accordance with the present disclosure, the variable impedance circuit 406 may comprise any suitable network comprising one or more variable reactive devices; e.g., variable inductor, variable capacitor, combinations of both, etc. FIGS. 4A and 4B merely illustrate some examples of the variable impedance circuit 406 in accordance with the present disclosure. The variable impedance circuit 406a shown in FIG. 4A, for example, shows a network comprising a variable capacitor C and a variable inductor L. In some embodiments, the control signal 414 may be one signal that controls both the variable capacitor C and the variable inductor L. A person of ordinary skill will understand that the variable impedance circuit 406 may comprise additional (or fewer) components. For example, in other embodiments, the variable impedance circuit 406 may include fixed value reactive devices, variable resistive elements, fixed value resistive elements, and so on. FIG. 4B illustrates another network configuration comprising a variable capacitor C and a variable inductor L. As indicated in FIG. 4B for the variable impedance circuit 406b, in some embodiments, the control signal 414 may comprise a first signal 414a to set the capacitance of variable capacitor C and a second signal 414b to set the inductance of variable inductor L. More generally control signal 414 may comprise one or more signals.

In accordance with the present disclosure, the variable impedance circuit 406 may be configured as means for mechanically adjusting a resonant frequency of the transmit coil 408. Variable reactance devices, e.g., inductors, capacitors, comprising the variable impedance circuit 406 may include electromechanical devices. An example of an electromechanical reactive device configured as means for mechanically adjusting a resonant frequency of the transmit coil 408 is an electromechanical inductor. Electromechanical devices in accordance with the present disclosure provide a continuous range of reactance values as compared to electronic switching implementations which can only provide discrete reactance values. Electronic switching implementations can introduce unwanted electromagnetic interference (EMI) because of the discontinuous stepwise nature of electronic switches.

Figure 5:
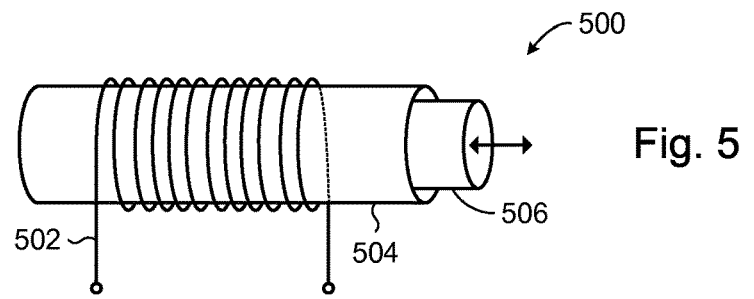
FIG. 5 shows an illustrative embodiment of an electromechanically actuated inductor.

The variable impedance circuit 406 may include an electromechanical inductor. FIG. 5 illustrates an example of an electromechanical inductor 500. In some embodiments, for example, electromechanical inductor 500 may comprise an inductor coil 502 wound about a bobbin 504. The inductor coil 502 may be any suitable electrically conductive material, such as wire for example. The bobbin 504 may be a non-ferromagnetic material. The electromechanical inductor 500 may further comprise a moveable ferrite slug 506 disposed within the bobbin 504. The slug 506 may be any suitable material such copper, for example. Changing the physical arrangement of the electromechanical inductor 500 by moving the slug 506 into and out of the bobbin 504 can change its inductance by increasing or decreasing the magnetic constant µ of the electromechanical inductor 500. For example, moving the slug 506 into the bobbin 504 can decrease inductance due to magnetically shorting some of the turns of the inductor coil 502.

In some embodiments, movement of the slug 506 may be controlled by a second electromechanical inductor (not shown) or motor (not shown) or to other mechanisms further described below. The slug 506 may be shared between the electromechanical inductor 500 and the second electromechanical inductor or motor. The controller 412 (FIG. 4) may energize the motor or the inductor coil in the second electromechanical inductor to move the slug 506 and hence vary the inductance of electromechanical inductor 500.

Figure 6:
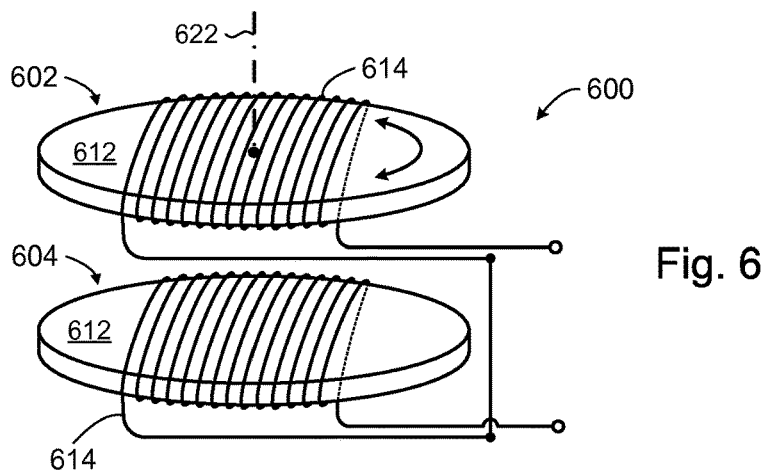
FIG. 6 shows an illustrative embodiment of an electromechanically actuated inductor.

FIG. 6 illustrates another example of an electromagnetic inductor as a means for mechanically adjusting a resonant frequency of a transmit coil (e.g., 408, FIG. 4). In some embodiments, electromechanical inductor 600 may comprise two inductor plates 602, 604. Each inductor plate 602, 604 may comprise a disk 612 of non-ferromagnetic material and an inductor coil (winding) 614 wound about the disk 612. The windings 614 of the inductor plates 602, 604 may be connected together in series. The first inductor plate 602 may be movable relative to the second inductor plate 604. In some embodiments, for example, the first inductor plate 602 may be rotatable about an axis 622. The second inductor plate 604 may be fixed relative to the first inductor plate 602. In some embodiments, for example, the second inductor plate 604 may be attached to the casing (not shown) that houses a power transmitting unit (PTU). In other embodiments, both inductor plates 602, 604 may be rotatable about axis 622. The inductance of the electromagnetic inductor 600 may vary depending on the relative orientation (physical arrangement) of the windings 614 between inductor plates 602, 604.

In some embodiments, motors or other suitable rotational drive (not shown) may be connected to either or both of the inductor plates 602, 604 or to other mechanisms further described below. The controller 412 (FIG. 4) can control the rotational drive to rotate either or both the inductor plates 602, 604 to achieve a desired inductance for electromagnetic inductor 600. Other examples are shown below.

Figure 7A:
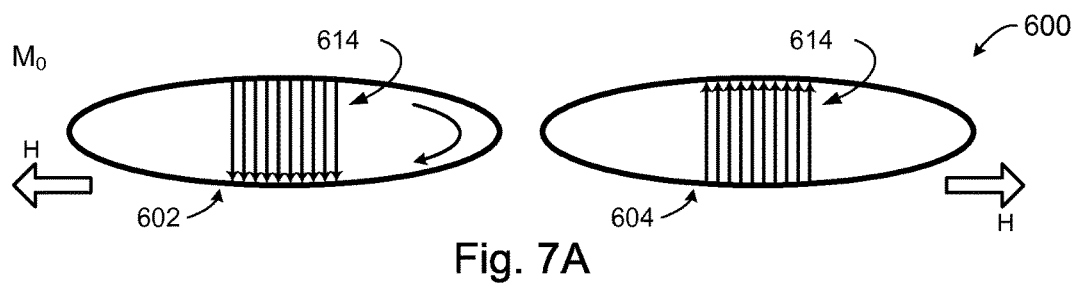
FIGS. 7A-7C illustrate a configuration of an electromechanically actuated inductor and different physical arrangements resulting in different inductances.
Figure 7B:
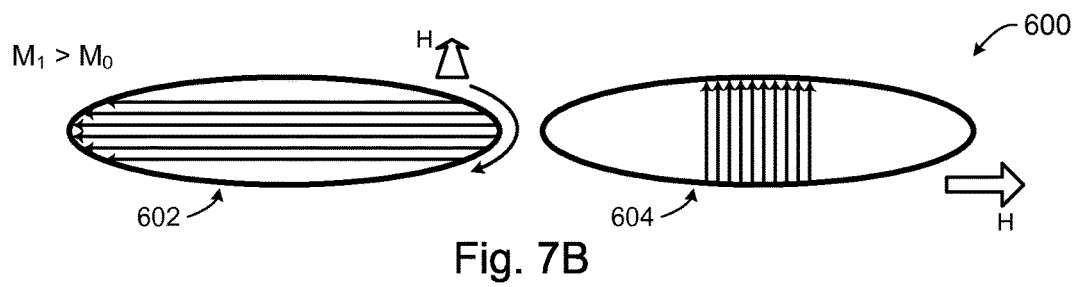
Figure 7C:
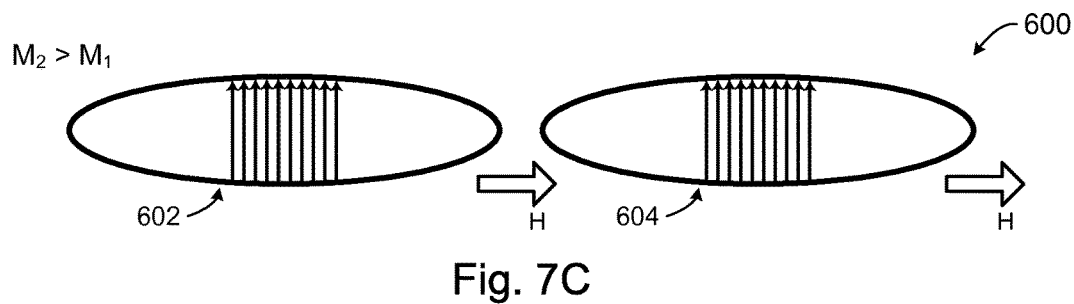

FIGS. 7A-7C schematically illustrate a configuration of the electromagnetic inductor 600 of FIG. 6 in accordance with some embodiments. The inductor plates 602, 604 comprising the electromagnetic inductor 600 may be arranged in side-by-side fashion. This arrangement can provide for a low profile electromagnetic inductor 600 design, e.g., for minimum thickness. To illustrate the direction of the windings 614 on respective inductor plates 602, 604, the windings 614 are depicted with arrowheads that indicate their winding direction. The direction of the magnetic fields (H) that may result when power is applied to the inductor plates 602, 604 are indicated by the larger arrows.

The inductance of electromagnetic inductor 600 depends on the alignment (physical arrangement) of respective windings 614 of inductor plates 602, 604 relative to each other. FIG. 7A, for example, illustrates an alignment that may result in minimum inductance $M_0$, where the windings 614 in respective inductor plates 602, 604 run in opposite directions. Accordingly, magnetic fields generated by the respective inductor plates 602, 604 would be in opposition, resulting in electromagnetic inductor 600 having minimum inductance. When the inductor plate 602 is rotated, for example in the clockwise direction, the inductance of electromagnetic inductor 600 may begin to increase as the magnetic fields generated by the inductor plates 602, 604 are no longer in full opposition.

FIG. 7B illustrates an alignment after inductor plate 602 has been rotated 90° clockwise, showing that the directions of windings 614 are 90° relative to each other. Accordingly, a magnetic field generated in inductor plate 602 would no longer point in the opposite direction as a magnetic field generated in inductor plate 604. The relative alignment of the inductor plates 602, 604 shown in FIG. 7B would exhibit a higher inductance $M_1$ ($>M_0$).

A further clockwise rotation of inductor plate 602 may align the windings 614 of both inductor plates 602, 604 so that magnetic fields generated by the inductor plates 602, 604 would point in the same direction. The relative alignment of the inductor plates 602, 604 shown in FIG. 7C could exhibit a maximum inductance, $M_2 > M_1$.

Figure 8A:
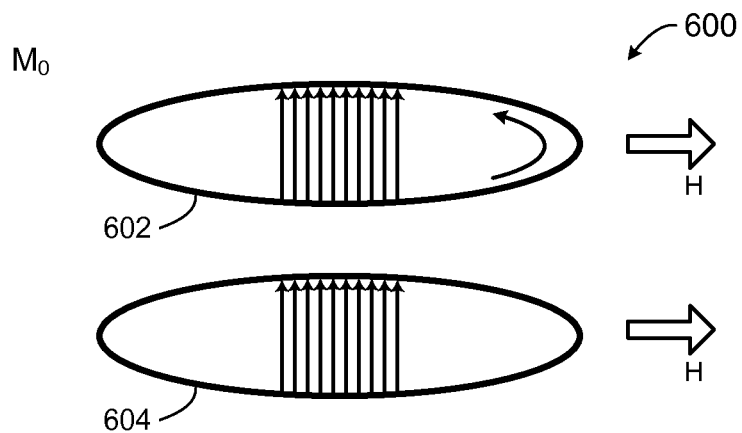
FIGS. 8A-8C illustrate a configuration of an electromechanically actuated inductor and different physical arrangements resulting in different inductances.
Figure 8B:
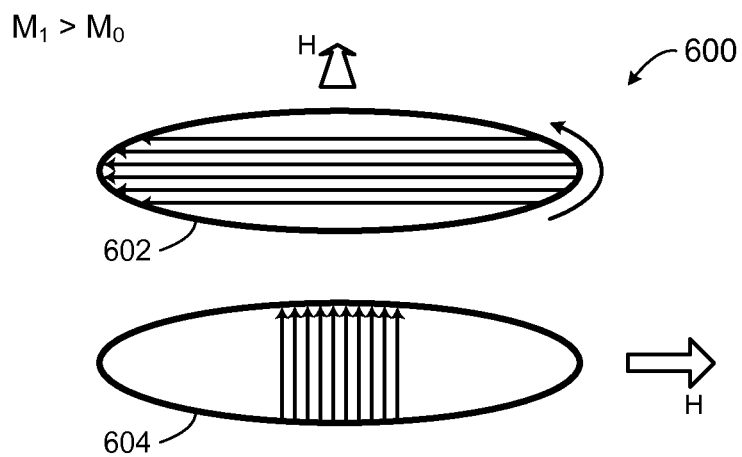
Figure 8C:
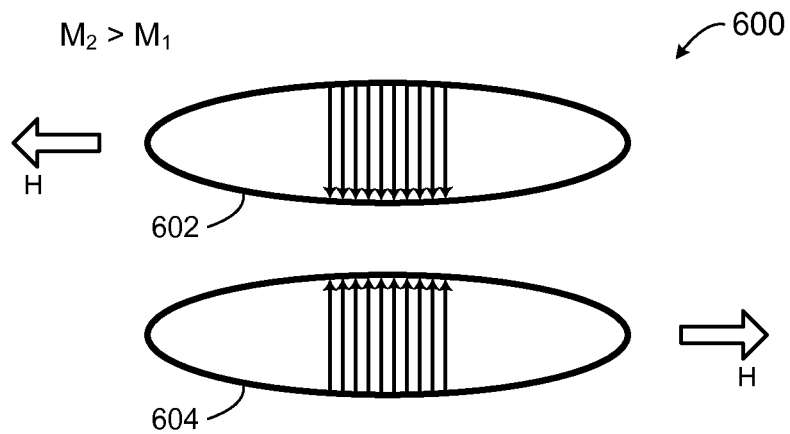

FIGS. 8A-8C schematically illustrate a configuration of the electromagnetic inductor 600 of FIG. 6 in accordance with other embodiments. The inductor plates 602, 604 comprising the electromagnetic inductor 600 may be arranged in stacked fashion. This arrangement can provide for an electromagnetic inductor 600 having a small footprint, e.g., minimum surface area.

FIG. 8A, illustrates an example of an alignment (physical arrangement) that can result in minimum inductance $M_0$, where the windings 614 are relatively aligned such that magnetic fields generated by the inductor plates 602, 604 would point in the same direction. FIG. 8B represents an alignment of the windings after a 90° counterclockwise rotation of inductor plate 602, showing a configuration where the inductance of electromagnetic inductor 600 has increased $M_1$ ($>M_0$) from its configuration in FIG. 8A. FIG. 8C represents a relative alignment of the windings 614 after another 90° counterclockwise rotation of inductor plate 602. The windings 614 are in full opposition, and so magnetic fields generated by inductor plates 602, 604 would point in opposite directions. Accordingly, the inductance of electromagnetic inductor 600 could be maximum, $M_2 > M_1$.

Figure 9:
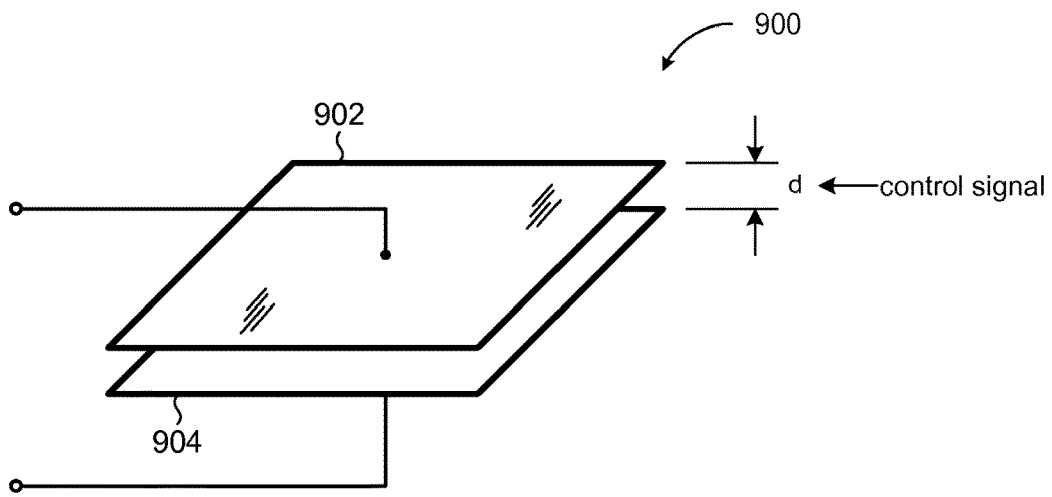
FIGS. 9, 9A and 9B illustrate different configurations of electromechanically actuated capacitors.

Another example of an electromechanical reactive device as a means for mechanically adjusting a resonant frequency of a transmit coil (e.g., 408, FIG. 4) is an electromechanical capacitor. FIG. 9 illustrates an example, in accordance with the present disclosure, of an electromechanical capacitor 900. In some embodiments, for example, electromechanical capacitor 900 may comprise a pair of moveable plates 902, 904. The capacitance of electromechanical capacitor 900 may be set by controlling the separation distance d (e.g., using control signal 414, FIG. 4) between the plates 902, 904; e.g., moving the plates 902, 904 closer together may increase capacitance and vice versa. In some embodiments, one plate 902 may remain fixed and the other plate 904 may move to achieve a desired separation d. In other embodiments, both plates 902, 904 may be moved. In some embodiments, either or both plates 902, 904 may be connected to respective motors or electromechanical inductors (not shown) or to other mechanisms further described below. The motors or electromechanical inductors may be operated by controller 412 (FIG. 4) to vary the separation distance d, and hence the capacitance of electromechanical capacitor 900.

Figure 9A:
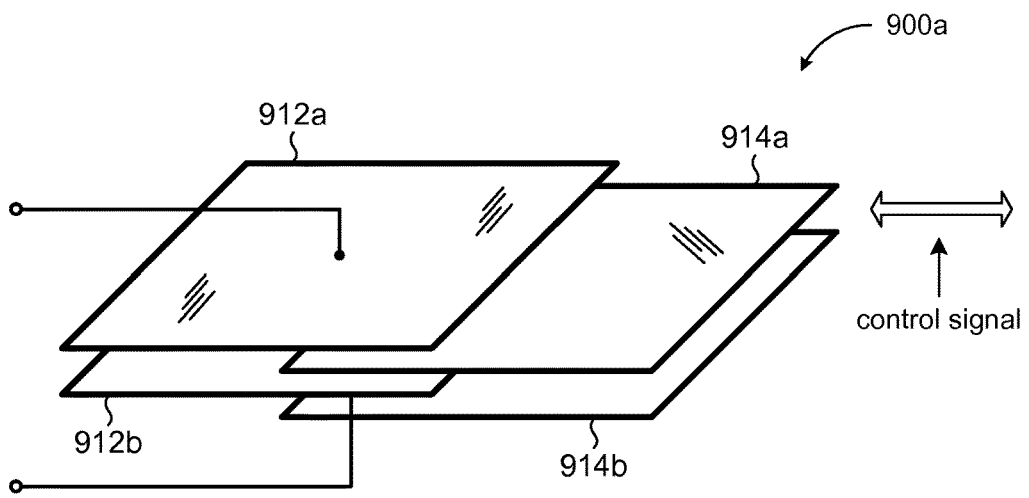

In some embodiments, an electromechanical capacitor may comprise interleaved plates. In FIG. 9A, for example, electromechanical capacitor 900a comprises plates 912a, 912b interleaved with plates 914a, 914b. Either or both sets of plates 912a/912b and 914a/914b may be moved to set a given capacitance; e.g., more overlap can increase capacitance, and vice versa. In some embodiments, either or both plates 914a, 914b may be connected to respective motors or electromechanical inductors (not shown) or to other mechanisms further described below. The motors or electromechanical inductors may be operated by a control signal 414 (FIG. 4) to increase or decrease the amount of overlap between sets of plates 912a/912b and 914a/914b and hence the capacitance of electromechanical capacitor 900.

Figure 9B:
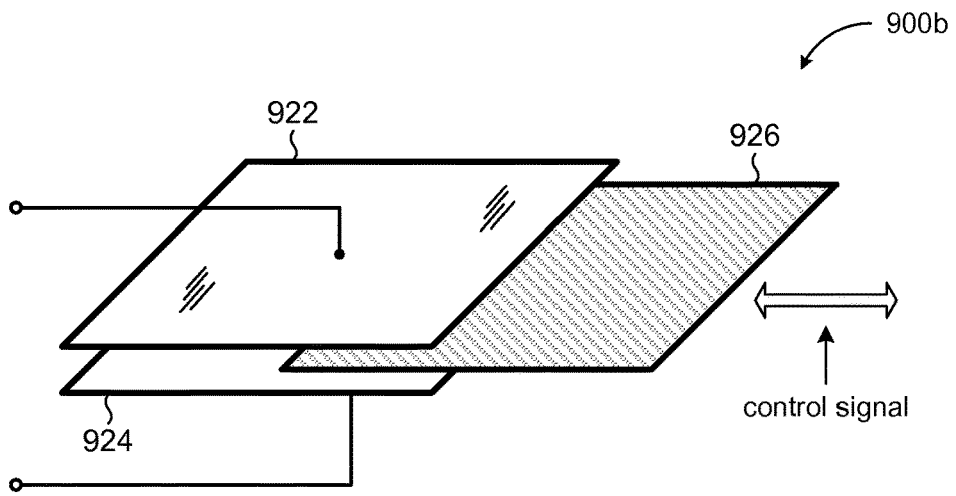

In some embodiments, an electromechanical capacitor may comprise plates with a dielectric material. In FIG. 9B, for example, electromechanical capacitor 900b comprises plates 922, 924 and a dielectric layer 926 dispose between plates 922, 924. Either or both the plates 922, 924 and dielectric layer 926 may be moved to change their physical arrangement to set a given capacitance; e.g., increasing the overlap of the plates 922, 924 and the dielectric layer 926 can increase capacitance, and vice versa. In some embodiments, dielectric layer 926 may be connected to motors or electromechanical inductors (not shown) or to other mechanisms further described below. The motors or electromechanical inductors may be operated by a control signal 414 (FIG. 4) to increase or decrease the amount of overlap of the plates 922, 924 and the dielectric layer 926 and hence the capacitance of electromechanical capacitor 900.

In accordance with some embodiments, a mechanism for moving the moveable components comprising foregoing described electromechanical reactive devices may employ the use of shape-memory alloy (SMA) wire. The properties of SMA alloy include changing shape when electrical current is applied and when existing current is removed. The following discussion describes various embodiments for electromechanically actuated inductors. A person of ordinary skill will appreciate, however, that similar arrangements can be readily provided for in electromechanically actuated capacitors.

Figure 10:
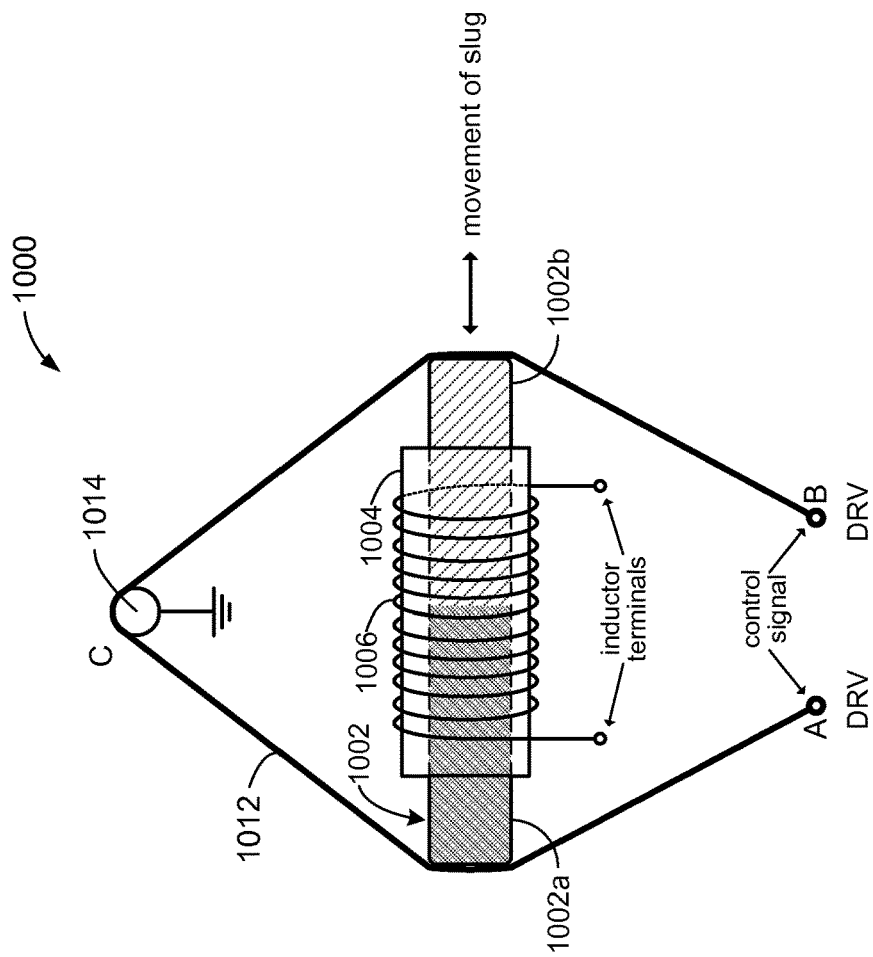

FIG. 10 shows another example of an electromechanical reactive device as a means for mechanically adjusting a resonant frequency of a transmit coil (e.g., 408, FIG. 4). In some embodiments, electromechanical inductor 1000 may comprise a moveable slug 1002 disposed within a bobbin 1004 with a conductive winding 1006 wrapped around the bobbin 1004. The moveable slug 1002 may comprise a plastic (or other non-ferromagnetic material) half 1002a and a ferrite half 1002b. SMA wire 1012 may be anchored at anchor points A, B, supported at point C, and wrapped across the ends of moveable slug 1002. Anchor points A, B may be attachments on a casing (not shown) that houses the PTU, for example. Support point C may be connected to ground potential. In some embodiments, a sheave 1014 may be provided at support point C.

In operation, a control signal 414 (FIG. 4) may be provided to the SMA wire 1012 at one of the drive inputs at anchor points A, B. In some embodiments, for example, the control signal 414 may be in the form of a controlled current. The control signal 414 will be grounded at support point C. The side of the SMA wire 1012 (e.g., anchor point A) that receives the control signal 414 may respond by changing its shape; e.g., that side of the SMA wire 1012 may contract and shorten in length. The contraction may move the slug 1002 to toward the right or left, depending on which side of the SMA wire 1012 contracts. Consequently, the inductance of the electromechanical inductor 1000 may be set by changing the physical arrangement between the slug 1002 and the bobbin 1004. For example, if the slug 1002 moves toward the left, then more of the ferrite half 1002*b* will move into the bobbin 1004 and thus increase inductance. Conversely, if the slug 1002 moves toward the right, then more of the plastic half 1002*a* will move into the bobbin 1004 and thus decrease inductance. Removal of the control signal 414 may reverse the contraction of the SMA wire 1012. In some embodiments, sheave 1014 may be provided at support point C to provide slippage of the SMA wire 1012, allowing the SMA wire 1012 to slide across the support point as the contracting side of the SMA wire 1012 pulls the on the non-contracting side.

Figure 11:
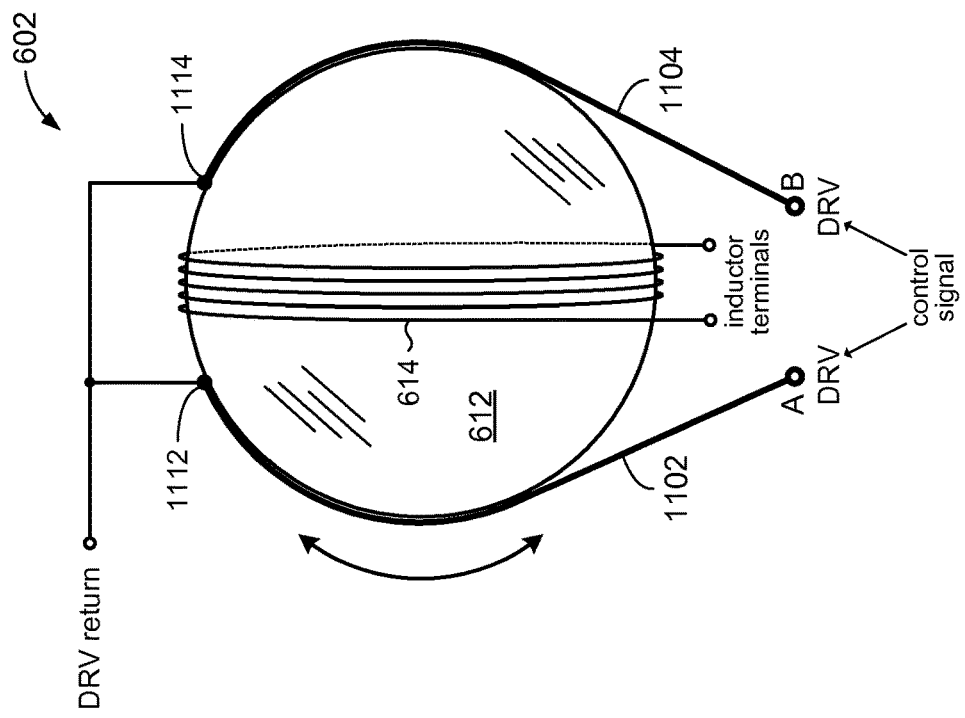
FIGS. 10, 11, 12, and 13 illustrate various embodiments of actuators for an electromechanically actuated inductor.

Referring to FIG. 11, in some embodiments, SMA wire may be used for rotating either (or both) inductor plates 602, 604 shown in FIG. 6. As shown in FIG. 11, for example, SMA wire 1102, 1104 may be attached to the disk 612 (e.g., of inductor plate 602). For example, SMA wire 1102, 1104 may attach at respective attachment points 1112, 1114 on the disk 612. The SMA wire 1102, 1104 may be anchored at anchor points A, B, which may be attachment points on a casing (not shown) that houses the PTU, for example.

In operation, a control signal 414 (FIG. 4) may be provided to the drive input of SMA wire 1102 at anchor point A, or to the drive input of SMA wire 1104 at anchor point B; e.g., in the form of a controlled current. Contraction of one of the SMA wires 1102, 1104 will pull on the disk 612 to rotate clockwise or counterclockwise in the direction of the contraction, thus changing the orientation the winding 614 of inductor plate 602 relative to the winding 614 of the other inductor plate 604 (FIG. 6). It is noted that principles of operation of the SMA wires as described with reference to FIGS. 10 and 11 may be applied to move the movable elements as described with reference to FIGS. 5, 6, and 9 and the like.

Figure 12:
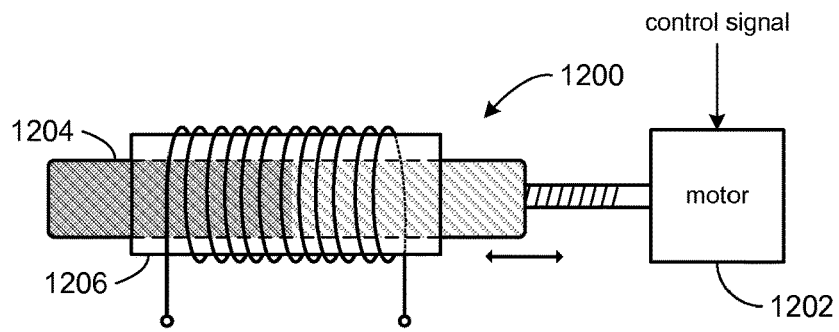

FIG. 12 shows another example of an electromechanical inductor as a means for mechanically adjusting a resonant frequency of a transmit coil (e.g., 408, FIG. 4). In some embodiments, a rotary actuator (e.g., a motor) 1202 may be used to operate an electromechanical inductor 1200. The rotary actuator 1202 may connect to a threaded slug 1204 to move the slug 1204 left or right. The slug 1204 may comprise a non-ferrite half and a ferrite half, as described above in FIG. 10. The inductance of electromechanical inductor 1200 may be set by changing the physical arrangement of the slug 1204 relative to the bobbin 1206. The rotary actuator 1202 may be advantageous in being able to rapidly change the inductance. In some embodiments, the rotary actuator 1202 may be operated by controller 412 to move the slug 1204 and hence change the inductance of electromechanical inductor 1200.

Figure 13:
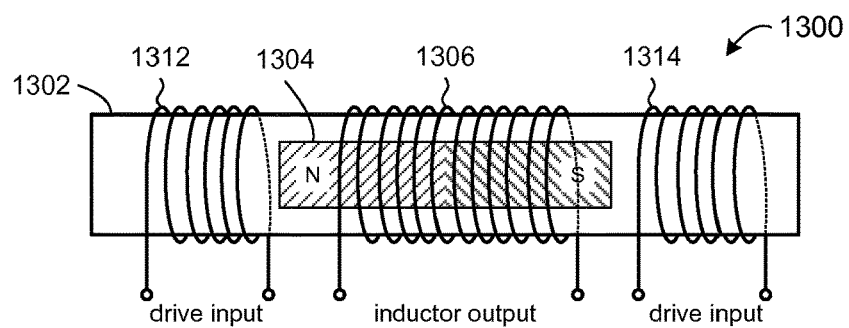

In some embodiments, electromagnets may be used to operate an electromechanical inductor. FIG. 13, for example, shows an example of an electromechanical inductor as a means for mechanically adjusting a resonant frequency of a transmit coil (e.g., 408, FIG. 4). An electromechanical inductor 1300 comprising a bobbin 1302 that houses a slug 1304. The slug 1304 may comprise a permanent magnet surrounded by a ferrite or copper covering. A coil 1312 wound about the bobbin 1302 may define an electromagnet and a coil 1314 wound about the bobbin 1302 may define another electromagnet. An inductor coil 1306 may be wound about the bobbin 1302 to define the inductive element. Control signals (e.g., 414, FIG. 4) may be provided to the drive inputs of coils 1312, 1314. In operation, the slug 1304 may be driven right or left by energizing one of the coils 1312, 1314, thus changing the physical arrangement of the slug 1304 within bobbin 1302 and hence the inductance of electromechanical inductor 1300. In some embodiments, the bobbin 1302 may be provided with a fluid or other lubrication to facilitate the movement of slug 1304 within bobbin 1302 when driven by coils 1312, 1314

Figure 14:
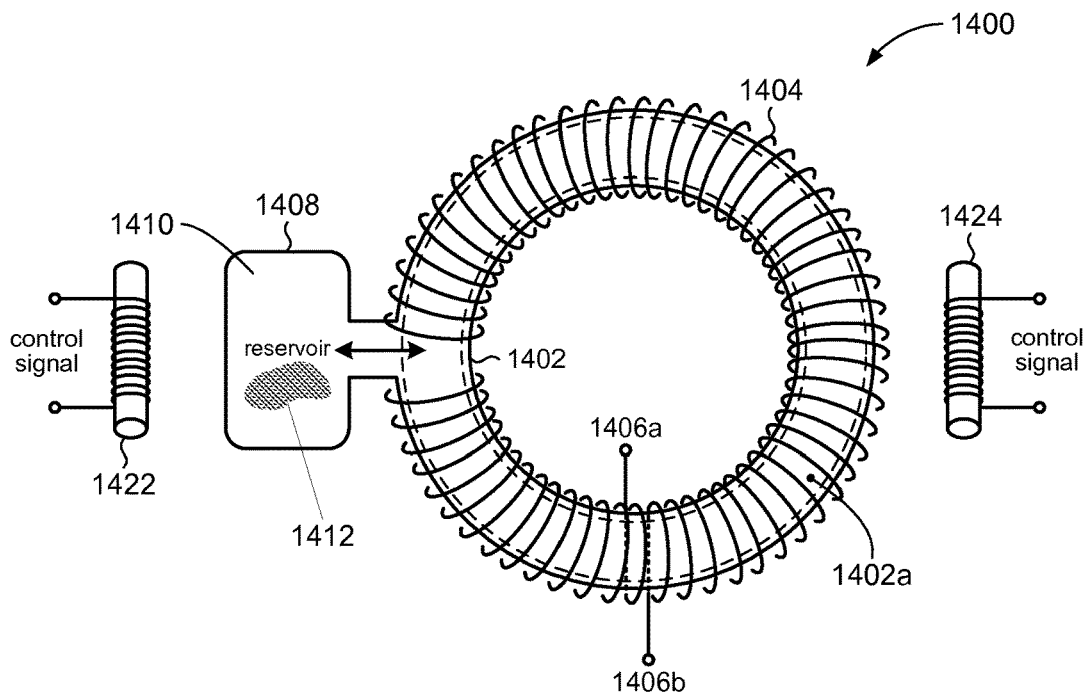
FIG. 14 illustrates an embodiment of a transmit coil in accordance with the present disclosure.

In some embodiments, the transmit coil 408 (FIG. 4) itself may be a means for mechanically adjusting its resonant frequency. The transmit coil 408 may be an electromechanical device that can be actuated to change the physical arrangement of components comprising the transmit coil 408 and hence the inductance of the transmit coil 408. In some embodiments, such as illustrated in FIG. 14 for example, a transmit coil 1400 may comprise a shell 1402 that encloses an interior volume 1402*a*. In some embodiments, the shell 1402 may have the general shape of a donut. A winding 1404 of electrically conductive material may be wound about the shell 1402 to define an inductive element. The winding 1404 may include drive terminals 1406*a*, 1406*b* to receive power, for example from a power amplifier, to drive the winding 1404.

The transmit coil 1400 may comprise a reservoir 1408 connected to an opening in the shell 1402. A fluid 1410 may fill the reservoir 1408 and the interior volume 1402*a* of the shell 1402. The fluid 1410 may comprise a quantity of ferromagnetic particles 1412 suspended in solution. The magnetic permeability of the shell 1402, and hence the inductance of the transmit coil 1400, can be set based on the quantity of ferromagnetic particles 1412 contained in the interior volume 1402*a* of the shell 1402.

The transmit coil 1400 may comprise electromagnets 1422, 1424. Each electromagnet 1422, 1424 may include drive terminals to receive a control signal (e.g., 414, FIG. 4). Control signals (e.g., control signal 414 of FIG. 4) can energize the electromagnets 1422, 1424. When an electromagnet is energized, it can generate a magnetic field that can attract the ferromagnetic particles 1412 toward it. For example, when electromagnet 1422 is energized, a magnetic field can be generated that attracts the ferromagnetic particles 1412 out of the interior volume 1402*a* of shell 1402 and into the reservoir 1408. Conversely, when electromagnet 1424 is energized, a magnetic field can be generated that attracts the ferromagnetic particles 1412 into the interior volume 1402*a* of the shell 1402. The strength of the control signals that drive the electromagnets 1422, 1424 can affect how quickly the ferromagnetic particles 1412 move and the quantity of the ferromagnetic particles 1412 moved. The control signals may comprise AC (time-varying) signals and/or DC signals.

Returning for a moment to FIG. 4, the resonator circuit 422 may become detuned with respect to the power amp 404 during wireless power transfer to a power receiving unit (PRU); in other words, the impedance of the resonator circuit 422 has changed. Detuning of the resonator circuit 422 may occur when the PRU draws more or less power from the magnetic field generated by the resonator circuit 422. Detuning may occur due to wide variations in the electromagnetic properties of the materials present in different PRUs, and so on. The detuning of resonator circuit 422 can create an impedance mismatch between the output impedance of the power amp 404 and the input impedance of the resonator circuit 422, resulting in less efficient operation of the power amp 404.

In some embodiments, a detuned resonator circuit 422 may be directly retuned by restoring the resonant frequency of the resonator circuit 422 at or near a predetermined resonant frequency.

In some embodiments, retuning a detuned resonator circuit 422 may be indirectly retuned. In some embodiments, for example, the AC power going into the resonator circuit 422 may be measured and used to detect that the resonator circuit 422 has become detuned. If the real and imaginary components of the measured AC power are in-phase, the impedance of the resonator circuit 422 is entirely real. If the real and imaginary components are out of phase, the impedance of the resonator circuit 422 is partly imaginary. Accordingly, detuning may be indicated by comparing the phase difference between the real and imaginary components of the AC power going into resonator circuit 422. For example, the controller 412 may generate control signal 414 based on the AC power measurement of the power going into the resonator circuit 422.

The control signal 414 can drive the variable impedance circuit 406 in a direction to retune the resonator circuit 422 so as to minimize the imaginary component based on the measured phase difference. In some embodiments, for example, the variable impedance circuit 406 may be an electromechanical inductor such as shown in FIG. 5 or FIG. 6, for example. In other embodiments, the variable impedance circuit 406 may be an electromechanical capacitor such as shown in FIG. 9A or 9B.

In some embodiments, the resonator circuit 422 may be retuned so that its impedance is entirely real. In other embodiments, variable impedance circuit 406 can be driven to maintain a desired fraction of the imaginary component, which may be more suitable in situations where the power amp 404 is more efficient/more rugged at a certain complex load.

In other embodiments, a detuned resonator circuit 422 may be indicated based on an overvoltage condition and/or an overcurrent condition in the power amp 404. In still other embodiments, the onset of an overvoltage condition and/or an overcurrent condition may be used to indicate a detuned resonator circuit 422 or the onset of detuning. Accordingly, the detuned resonator circuit 422 may be retuned as a consequence of reacting to an overvoltage and/or an overcurrent condition. For example, the complex impedance of the resonator circuit 422 may be regulated with a feedback loop to prevent the overvoltage condition and/or the overcurrent condition.

Figure 15:
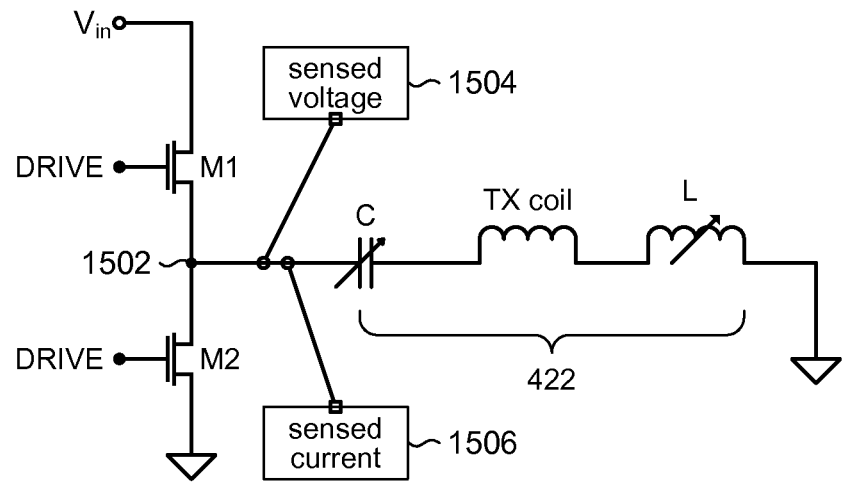
FIGS. 15 and 16 show illustrative embodiments for sensing voltage and/or current.

In some embodiments, the power amp 404 may be a Class D amplifier. Referring to FIG. 15, the output stage of a Class D amplifier may include drive transistors M1, M2 (e.g., power MOSFETS, metal-oxide semiconductor field effect transistors). Output power may be provided at output node 1502. A sense circuit 1504 may provide a sensed voltage (e.g., drain voltage) at the output node 1502. The sensed voltage may be used to detect an overvoltage condition or the onset of an overvoltage condition. A sense circuit 1506 may provide a sense current (e.g., drain current) at the output node 1502. The sensed current may be used to detect an overcurrent condition or the onset of an overcurrent condition. A control signal may be generated in response to the sensed voltage and/or the sensed current being above a predetermined threshold. The feedback loop can be closed by using the control signal 414 (FIG. 4) to drive either or both an electromechanical capacitor C or an electromechanical inductor L in a direction in order to reduce the sensed voltage and/or the sensed current; e.g., below the predetermined threshold. In some embodiments, the average value of the sensed voltage or sensed current may be used. In other embodiments, the peak value of the sensed voltage or sensed current may be used.

Figure 16:
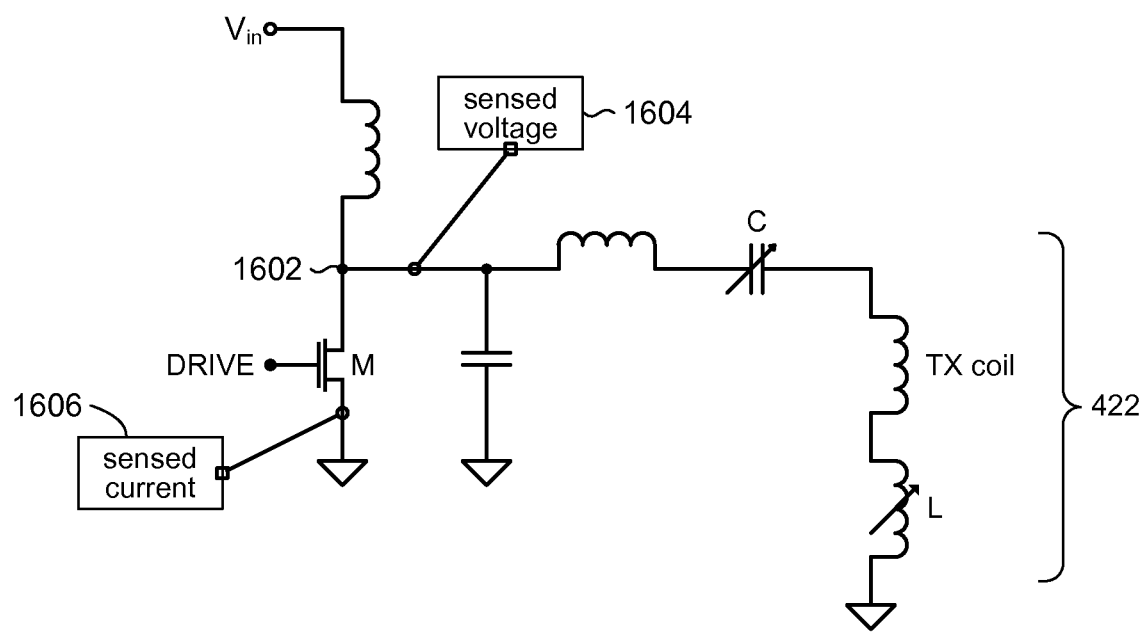

As another example, in some embodiments, the power amp 404 may be a Class E amplifier. Referring to FIG. 16, the output stage of a Class E amplifier may include drive transistor M (e.g., a power MOSFET). Output power may be provided at output node 1602. A sense circuit 1604 may provide a sensed voltage (e.g., drain voltage) at the output node 1602. A sense circuit 1606 may provide a sense current (e.g., drain current) at the output node 1602. As in the Class D amplifier example above, the feedback loop can be closed by driving either or both the electromechanical capacitor C or the electromechanical inductor L in a direction to reduce the sensed voltage and/or the sensed current (e.g., below a predetermined threshold) to respond to an overvoltage or overcurrent condition.

In many cases, a power amplifier working into an "ideal" load will have voltage and/or current zero cross locations coincident with device turn-on and turn-off. This represents the most efficient operating point for the amplifier.

Figure 18:
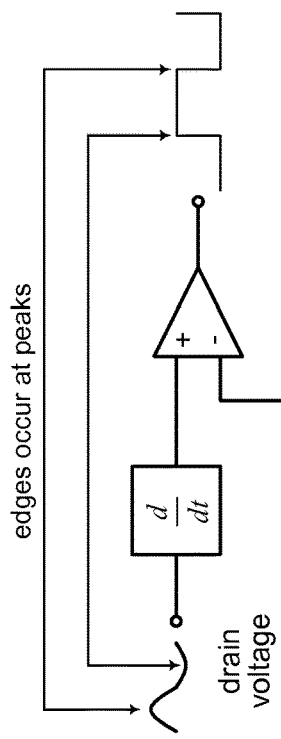
FIGS. 17 and 18 illustrate an example of peak detection.
Figure 17:
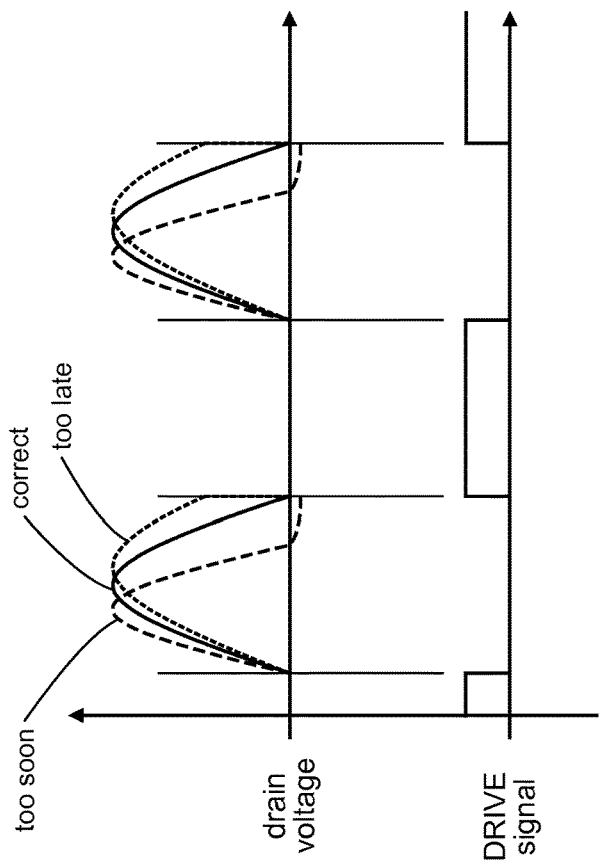

Simple circuits can identify the zero cross point in several ways. One way, for example, is to detect the timing of the peak point of the voltage or current waveform. If the peak occurs at the 90° point, then the zero cross will likely occur at the 180° point, and the system is working into an ideal load. If the peak occurs at the 60° point, it is likely that zero cross will occur at the 120° point (i.e., "too soon"). Conversely, if the peak occurs at the 100° point it is likely that zero cross will occur at the 200° point (i.e., "too late"). FIG. 17 illustrates an example of peaks occurring too soon, peaks occurring at the correct time, and peaks occurring too late. An example of a peak detector is shown in FIG. 18.

Figure 19:
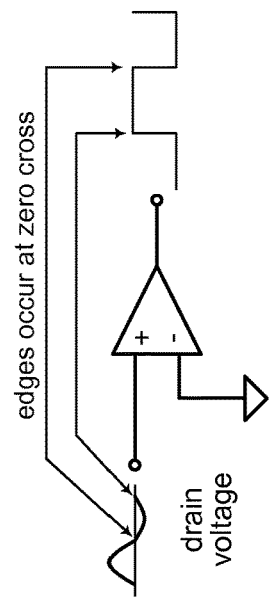
FIG. 19 shows an example circuit for zero-cross detection.

As another example, another way is to look for the actual zero cross. A simple comparator (FIG. 19) can detect the zero cross event. When the comparator output changes states, the zero cross has occurred. This approach may not be suitable for every configuration since, for example, the commutation of a Class D amplifier will "force" a zero cross. Accordingly, this approach may be suitable for detecting leading (or "too soon") waveforms.

Figure 20:
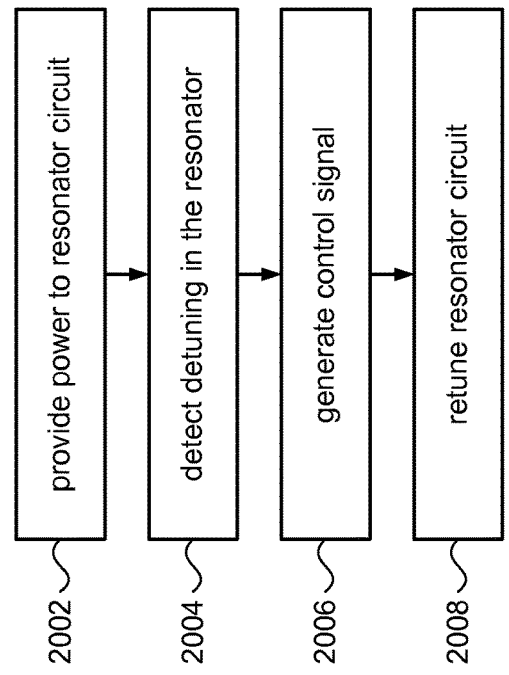
FIG. 20 illustrates operation of wireless power transfer in accordance with the present disclosure.

Operation of the transmit circuitry 400 shown in FIG. 4 will be described in connection with the flow shown in FIG. 20. At block 2002, power may be applied to the resonator circuit 422 to generate an external magnetic field 42 that can be coupled to by an external device 44. In some embodiments, for example, the external device 44 may be a PRU configured to wirelessly receive power via the magnetic field. In accordance with the present disclosure, the resonator circuit 422 may comprise a transmit coil 408 and a variable impedance circuit 406. In various embodiments the variable impedance circuit 406 may comprise one or more electromechanically operated reactive devices such as capacitors and inductors such as shown in FIGS. 5-7 and 9-14.

At block 2004, detuning of the resonator circuit 422 may be detected. In some embodiments, for example, detuning of the resonator circuit 422 may be determined by monitoring the power output of the power amp 404; e.g., using sense circuits 416, 418, or otherwise measuring the power output. In other embodiments, detuning may be determined based on the phase difference between a sensed voltage component of the power output and a sensed current component of the power output. In other embodiments, the drain voltage or drain current may be monitored at the output stage of the power amp. Detuning of the resonator circuit may be indicated when the monitored parameter (voltage or current) exceeds a predetermined level.

At block 2006, a control signal 414 may be generated in response to an indication that the resonator circuit has been detuned. For example, detuning may occur as the impedance of the resonator circuit 422 seen by the power amp 404 changes due to the external device 44 drawing more power, or due to materials used by different external devices having different electromagnetic properties. In some embodiments, the control signal 414 may be configured to retune the resonator circuit 422 in order to achieve a desired phase difference in the voltage and current components of the monitored power output. In other embodiments, the control signal 414 may be configured to retune the resonator circuit 422 in order to achieve a desired level of drain voltage or drain current in the output stage of the power amp 404.

At block 2008, the control signal 414 may be used to retune the resonator circuit 422. For example, retuning may involve changing the impedance of one or more reactive elements comprising the resonator circuit 422. In some embodiments, retuning may include changing the reactive properties of the transmit coil 408 itself. In accordance with the present disclosure, the control signal 414 may drive one or more moveable components of the electromechanically operated reactive devices. In some embodiments, for example, the control signal 414 may drive the position of a slug in an electromechanical inductor (e.g., 506, FIG. 5) to achieve change its inductances. In other embodiments, the control signal 414 may rotate inductor plates (e.g., 602, FIG. 6). In other embodiments, the position of capacitor plates (e.g., 902, 904, FIG. 9) may be changed in an electromechanical capacitor (e.g., 900, FIG. 9).

In some embodiments, a physical arrangement of the transmit coil 408 itself may be altered. Referring to FIG. 14, for example, in some embodiments, the transmit coil 1400 may comprise a shell 1402 containing ferrite-bearing fluid 1412. The fluid 1412 may be moved in and out of the shell 1402 to vary the magnetic permeability of the transmit coil 1400 and hence its inductance.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

The following is claimed:

1. An apparatus for wireless power transmission, the apparatus comprising:
   a resonator circuit configured to generate a magnetic field to couple to a power receiving unit, the resonator circuit comprising a transmit coil and at least one electromechanical reactive device, the at least one electromechanical reactive device comprising a plurality of components including one or more moveable components and having a reactance that is determined by a physical arrangement of the plurality of components;
   a power circuit electrically connected to the resonator circuit and configured to provide power to drive the transmit coil to generate the magnetic field; and
   a controller electrically connected to the at least one electromechanical reactive device of the resonator circuit and configured to actuate one or more of the at least one electromechanical reactive device to move at least one of the one or more moveable components to change the physical arrangement of the plurality of components, and hence to change an available reactance providable by the at least one electromechanical reactive device, wherein to move at least one of the one or more moveable components the controller is configured to:
      change a relative physical relationship of a dielectric layer relative to a plurality of first conductive plates; or
      change a relative physical relationship of a second conductive plate relative to a plurality of third conductive plates; or
      change a relative physical relationship of a plurality of side-by-side windings; or
      change a relative physical relationship of a plurality of stacked windings; or
      vary an amount of overlap between a moveable ferrite slug and a winding of conductive material to vary an inductance, the moveable ferrite slug being disposed within the winding of conductive material of an electromechanical inductor of the at least one electromechanical reactive device, and shape-memory alloy wire being attached to the moveable ferrite slug; or
      a combination of two or more of these.

2. The apparatus of claim 1, wherein the controller is configured to change the reactance of at least one of the at least one electromechanical reactive device to maintain the resonant frequency of the resonator circuit at a predetermined resonant frequency.

3. The apparatus of claim 1, wherein the controller is configured to actuate one or more of the at least one electromechanical reactive device based on an alternating current (AC) power at the transmit coil.

4. The apparatus of claim 1, wherein the controller is configured to actuate one or more of the at least one electromechanical reactive device based on a real component of AC power at the transmit coil and on an imaginary component of the AC power at the transmit coil.

5. The apparatus of claim 4, wherein the controller is configured to actuate one or more of the at least one electromechanical reactive device in response to the resonator circuit being detuned.

6. The apparatus of claim 5, wherein a phase difference between the real component of the AC power at the transmit coil and the imaginary component of the AC power at the transmit coil indicates that the resonator circuit is detuned.

7. The apparatus of claim 4, wherein the controller is configured to change the reactance of one or more of the at least one electromechanical reactive device until a predetermined phase difference is detected.

8. The apparatus of claim 1, wherein the controller is configured to actuate one or more of the at least one electromechanical reactive device in response to detection that a sensed voltage level and/or a sensed current flow exceeds a predetermined threshold.

9. The apparatus of claim 8, wherein the controller is configured to drive the reactance of one or more of the at least one electromechanical reactive device in a direction that causes the sensed voltage level and/or a sensed current flow to fall below the predetermined threshold.

10. The apparatus of claim 1, wherein a first component of one or more of the at least one electromechanical reactive device has a physical position that can change in response to the controller, the first component having a first physical position associated with a first reactance and at least a second physical position associated with a second reactance.

11. The apparatus of claim 1, wherein one or more of the at least one electromechanical reactive device is configured to provide a continuous range of selectable reactance values.

12. The apparatus of claim 1, wherein the at least one electromechanical reactive device comprises an electromechanical inductor.

13. An apparatus for wireless power transmission, the apparatus comprising:
a resonator circuit configured to generate a magnetic field to couple to a power receiving unit, the resonator circuit comprising a transmit coil and at least one electromechanical reactive device, the at least one electromechanical reactive device comprising a plurality of components including one or more moveable components and having a reactance that is determined by a physical arrangement of the plurality of components;
a power circuit electrically connected to the resonator circuit and configured to provide power to drive the transmit coil to generate the magnetic field; and
a controller electrically connected to the at least one electromechanical reactive device of the resonator circuit and configured to actuate one or more of the at least one electromechanical reactive device to move at least one of the one or more moveable components to change the physical arrangement of the plurality of components, and hence to change an available reactance providable by the at least one electromechanical reactive device;
wherein the at least one electromechanical reactive device comprises an electromechanical inductor that comprises a pair of rotatable plates, each rotatable plate having a winding comprising a conductive material wound about the rotatable plate, wherein an inductance of the electromechanical inductor is determined by a relative orientation of the windings between the rotatable plates.

14. The apparatus of claim 13, further comprising shape-memory alloy wire connected to either or both of the rotatable plates and configured to cause rotation of one rotatable plate relative to the other rotatable plate.

15. The apparatus of claim 12, wherein the electromechanical inductor comprises a moveable permanent magnet disposed within a winding of conductive material and first and second electromagnets at first and second ends of the winding of conductive material, the first and second electromagnets configured to vary an amount of overlap between the moveable permanent magnet and the winding of conductive material to vary an inductance of the electromechanical inductor.

16. The apparatus of claim 1, wherein one or more of the at least one electromechanical reactive device is an electromechanical capacitor comprising a plurality of interleaved electrically conductive plates.

17. The apparatus of claim 1, wherein one or more of the at least one electromechanical reactive device is an electromechanical capacitor comprising at least a pair of electrically conductive plates and a dielectric material disposed between the pair of electrically conductive plates.

18. A method for wirelessly transmitting power comprising:
providing power to a resonator circuit to generate a magnetic field at a resonant frequency that can couple to a power receiving unit;
detecting that the resonator circuit has become detuned; and
retuning the resonator circuit in response to detecting that the resonator circuit has become detuned, including actuating at least one electromechanical reactive device in the resonator circuit to change an available reactance providable by the at least one electromechanical reactive device, and hence the resonant frequency of the resonator circuit, by:
changing a relative physical relationship of a dielectric layer relative to a plurality of first conductive plates; or
changing a relative physical relationship of a second conductive plate relative to a plurality of third conductive plates; or
changing a relative physical relationship of a plurality of side-by-side windings; or
changing a relative physical relationship of a plurality of stacked windings; or
varying an amount of overlap between a moveable ferrite slug and a winding of conductive material to vary an inductance, the moveable ferrite slug being disposed within the winding of conductive material of an electromechanical inductor of the one or more electromechanical reactive device, the electromechanical inductor comprising shape-memory alloy wire attached to the moveable ferrite slug; or
a combination of two or more of these.

19. The method of claim 18, wherein the resonator circuit is detuned when an impedance of the resonator circuit has deviated from a predetermined impedance.

20. The method of claim 18, wherein retuning the resonator circuit includes changing the reactance of the at least one electromechanical reactive device to maintain the resonator circuit at a predetermined resonant frequency.

21. The method of claim 18, wherein detecting that the resonator circuit has become detuned comprises making an AC power measurement, wherein retuning the resonator circuit comprises adjusting a real component of the AC power measurement and/or an imaginary component of the AC power measurement by actuating the at least one electromechanical reactive device.

22. The method of claim 18, wherein detecting that the resonator circuit has become detuned comprises sensing one or more of a voltage level and a current flow.

23. The method of claim 22, wherein the resonator circuit is deemed to be detuned when a sensed voltage level or a sensed current level exceeds a predetermined threshold.

24. The method of claim 23, wherein the retuning the resonator circuit includes driving the available reactance of the at least one electromechanical reactive device in a direction such that a sensed voltage level and/or a sensed current flow falls below the predetermined threshold.

25. An apparatus for wirelessly transmitting power comprising:
means for generating a magnetic field configured to couple to an external device for wireless power transfer to the external device;
means for sensing a power used to generate the magnetic field and for generating a control signal depending on the power sensed; and
means for mechanically adjusting a resonant frequency of the means for generating the magnetic field in response to the control signal, the means for mechanically adjusting comprising means for changing an available reactance providable by an electromechanical reactance device of the means for generating the magnetic field, the means for changing an available reactance comprising:

means for changing a relative physical relationship of a dielectric layer relative to a plurality of first conductive plates; or means for changing a relative physical relationship of a second conductive plate relative to a plurality of third conductive plates; or means for changing a relative physical relationship of a plurality of side-by-side windings; or means for changing a relative physical relationship of a plurality of stacked windings; or means for varying an amount of overlap between a moveable ferrite slug and a winding of conductive material to vary an inductance, the moveable ferrite slug being disposed within the winding of conductive material, the means for varying comprising shape-memory alloy wire attached to the moveable ferrite slug; or a combination of two or more of these.

26. An apparatus for wireless power transmission comprising:

a transmit coil configured to generate a magnetic field to couple to a power receiving unit, the transmit coil comprising:

a shell having an interior volume of the shell;

a conductive material wound about the shell; and a fluid contained within the interior volume of the shell, the fluid having suspended therein ferromagnetic particles;

a power circuit configured to provide power to the conductive material wound about the shell; and a controller configured to selectively control movement of the ferromagnetic particles into and out of the interior volume of the shell in response to a power output of the power circuit to change an available reactance providable by the transmit coil.

27. The apparatus of claim 26, wherein the shell is donut-shaped.

28. The apparatus of claim 26, wherein the transmit coil further comprises a reservoir in fluid communication with the shell, a first electromagnet, and a second electromagnet, the first electromagnet arranged to attract the ferromagnetic particles out of the shell and into the reservoir, the second electromagnet arranged to attract the ferromagnetic particles out of the reservoir and into the shell.

29. The apparatus of claim 28, wherein the controller is configured to control the first and second electromagnets to move the ferromagnetic particles into and out of the shell.

30. The apparatus of claim 25, wherein the means for mechanically adjusting the resonant frequency are configured to change the available reactance providable by the electromechanical reactance device to maintain the resonant frequency at a predetermined resonant frequency.

* * * * *